US012778285B2

(12) United States Patent
Jung

(10) Patent No.: US 12,778,285 B2
(45) Date of Patent: Nov. 3, 2026

(54) LOCKING DEVICE FOR LUGGAGE STORAGE RACK

(71) Applicant: MORRIS & CO CO., LTD., Chungcheongbuk-do (KR)

(72) Inventor: Tae Bong Jung, Chungcheongbuk-do (KR)

(73) Assignee: MORRIS&CO CO., LTD., Eumseong-Gun (KR)

( * ) Notice: Subject to any disclaimer, the term of this patent is extended or adjusted under 35 U.S.C. 154(b) by 7 days.

(21) Appl. No.: 19/180,448

(22) Filed: Apr. 16, 2025

(65) Prior Publication Data

US 2026/0157521 A1 Jun. 11, 2026

(30) Foreign Application Priority Data

Sep. 6, 2024 (KR) ........................ 10-2024-0121463

(51) Int. Cl.
*A47B 81/00* (2006.01)
*E05B 37/00* (2006.01)
*E05B 73/00* (2006.01)

(52) U.S. Cl.
CPC .............. *A47B 81/00* (2013.01); *E05B 37/00* (2013.01); *E05B 73/0005* (2013.01)

(58) Field of Classification Search
CPC ...... E05B 49/00; E05B 15/00; E05B 73/0005; E05B 37/00; E05C 3/0542; A47B 81/00
See application file for complete search history.

(56) References Cited

U.S. PATENT DOCUMENTS 4,066,195 A * 1/1978 Dickler ..................... A45F 3/00 70/76
4,069,691 A * 1/1978 Simpson ............... E05B 69/006 70/59
(Continued)

FOREIGN PATENT DOCUMENTS

FR 2907485 A1 * 4/2008 ........... E05B 47/023
JP 5219914 B2 6/2013
(Continued)

OTHER PUBLICATIONS

European Search Report on European Patent Application No. EP 25 17 0730, dated Oct. 20, 2025.

*Primary Examiner* — Patrick D Hawn
(74) *Attorney, Agent, or Firm* — LRK PATENT LAW FIRM

(57) ABSTRACT

Proposed is a locking device for a luggage storage rack, which is provided on a luggage storage rack consisting of vertical and horizontal frames, the locking device including a catching part having a locking hole connected on vertical and horizontal parts of each of the horizontal frames, and a cantilever structure support end provided on the vertical and horizontal parts due to the locking hole, a locking module provided with a password button, a lock/unlock knob, and a lock/unlock member on the back surface of the vertical part, and installed in the vertical part to selectively open and close the locking hole by rotating the lock/unlock member within a set angle, and a locking wire with a first end fixed to each of the horizontal or vertical frames while a second end having a locking ring for penetration of the support end.

5 Claims, 14 Drawing Sheets

(56) References Cited

U.S. PATENT DOCUMENTS

| | | | | | |
|---|---|---|---|---|---|
| 4,212,175 | A * | 7/1980 | Zakow | E05B 73/0005 | 70/58 |
| 4,460,093 | A * | 7/1984 | Otema | E05B 73/0005 | 70/59 |
| 4,756,171 | A * | 7/1988 | Homar | E05B 67/006 | 70/30 |
| 5,154,072 | A * | 10/1992 | Leyden | E05B 69/006 | 70/59 |
| 6,622,532 | B2 * | 9/2003 | Hsu | G06F 1/181 | 248/316.4 |
| 6,807,832 | B1 * | 10/2004 | Jeng | E05B 73/0005 | 70/68 |
| 8,736,450 | B2 * | 5/2014 | Brown | E05B 73/0005 | 248/65 |
| 9,222,285 | B1 * | 12/2015 | Ilislamloo | G08B 3/10 | |
| 10,258,130 | B2 * | 4/2019 | Janzen | A45C 13/103 | |
| 10,641,011 | B2 * | 5/2020 | Klinkman | E05B 67/383 | |
| 2014/0174137 | A1 * | 6/2014 | Xue | E05B 73/0005 | 70/14 |
| 2020/0149322 | A1 * | 5/2020 | Heath | E05B 73/0005 | |

FOREIGN PATENT DOCUMENTS

| | | | | |
|---|---|---|---|---|
| JP | 2014-142842 | A | 8/2014 | |
| KR | 200168331 | Y1 * | 2/2000 | E05B 15/00 |
| KR | 102076045 | B1 * | 2/2020 | E05B 73/0005 |
| WO | WO-9629684 | A1 * | 9/1996 | E05B 73/0011 |

* cited by examiner (a)

(b)

LOCKING DEVICE FOR LUGGAGE STORAGE RACK

CROSS REFERENCE TO RELATED APPLICATION

The present application claims priority to Korean Patent Application No. 10-2024-0121463, filed Sep. 6, 2024, the entire contents of which is incorporated herein for all purposes by this reference.

BACKGROUND

1. Field of the Invention

The present disclosure relates to a locking device for a luggage storage rack and, more particularly, to a locking device for a luggage storage rack, which can be used to prevent theft of travel luggage, bags, and other items temporarily stored in a storage rack and to prevent arbitrary unlocking of a locking wire provided in the storage rack.

2. Description of Related Art

In general, storage units with doors offer storage spaces for relatively small items, and bulky travel bags are stored in luggage storage racks.

As shown in FIG. 1 among the attached drawings, a storage unit 1 has a cabinet shape with a door 1-2, and is configured to store items by opening the door 1-2 equipped with a locking device 1-3, putting the items into the storage space, closing the door 1-2, and locking the locking device 1-3.

Conventional storage units may prevent damage to items and theft by keeping small items out of sight, but it is difficult to store bulky bags or travel luggage in the storage units.

To solve the problems of such storage units, as a conventional technology associated with storage racks, Korean Patent No. 10-2076045 (Publication Date: Feb. 11, 2020) discloses a luggage storage device. The luggage storage device consists of a base unit with a rail formed thereon and a movable unit, wherein the movable unit is configured to move in one direction along the rail. In addition, the movable unit is equipped with a locking member, a locking member holder, and a switch, so that luggage can be easily stored and theft can be prevented by using a locking means.

However, luggage storage devices of the above structure have the problem that storing multiple bags is difficult, and because a large number of components are required to store a single piece of luggage, the manufacturing cost increases.

Document of Related Art (Patent Document 1) Korean Patent No. 10-2076045 (Publication Date: Feb. 11, 2020)

SUMMARY

Accordingly, the present disclosure has been made keeping in mind the above problems occurring in the related art, and the present disclosure is intended to provide a locking device for a luggage storage rack, which can be used to prevent theft of travel luggage, bags, and other items temporarily stored in a storage rack and to prevent arbitrary unlocking of a locking wire provided in the storage rack.

Objectives of the present disclosure are not limited to the ones mentioned above.

In addition, other objectives not mentioned will be clearly understood by those skilled in the art to which the present disclosure pertains from the description below.

In order to achieve the above objective, according to an aspect of the present disclosure, there is provided a locking device for a luggage storage rack, which is provided on a travel luggage storage rack consisting of vertical frames arranged vertically and horizontal frames connecting the vertical frames to create an open luggage storage space, and is provided on any of the horizontal frames to prevent theft of luggage stored in the luggage storage space, the device including: a catching part having: a locking hole formed to be connected on a vertical part and a horizontal part of each of the horizontal frames; and a cantilever structure support end provided on the vertical part and the horizontal part due to the locking hole; a locking module provided with a password button, a lock/unlock knob, and a lock/unlock member placed on a back surface of the vertical part, and installed in the vertical part to selectively open and close the locking hole by rotating the lock/unlock member within a set angle; and a locking wire with a first end fixed to each of the horizontal frames or the vertical frames while a second end provided with a locking ring for penetration of the support end, wherein the locking ring passes through a handle of the luggage stored in the luggage storage space and then is caught on the support end through the locking hole, wherein with the locking ring hooked on the support end, the lock/unlock member may close the locking hole to maintain a locking state of the locking wire, and when the lock/unlock member opens the locking hole, the locking state of the locking wire may be released.

The lock/unlock member may include: a coupling end coupled to an end of a rotary shaft of the locking module; and a catching end bent in a direction of the back surface of the vertical part at the coupling end and then bent horizontally again after approaching the back surface of the vertical part, so that when the lock/unlock knob rotates for locking, an end area of the catching end is located on a back of the support end.

On the back of the support end, or on the back of the support end and the lock/unlock member, a forced release prevention means may be provided to prevent the locking wire from passing between the catching end and an edge of the locking hole in a state in which the catching end crosses and closes the locking hole.

The forced release prevention means may include a locking part having an insertion groove provided on the back surface of the support end so that a part of the catching end is inserted while crossing and closing the locking hole when the lock/unlock member rotates for locking around the rotary shaft of the locking module, wherein the locking part may be configured such that the remaining area is closed except for the side where the part of the catching end is inserted or removed.

The forced release prevention means may be composed of: at least one separation prevention groove formed in an arc shape on the back surface of s vertical support end of the support end corresponding to the rotational trajectory of the lock/unlock member; and at least one separation prevention protrusion formed with the same curvature as the separation prevention groove on the back surface of the catching end so as to be inserted into the separation prevention groove when the lock/unlock member rotates for locking, wherein when the lock/unlock member rotates for locking, the separation prevention protrusion is inserted into the separation prevention groove to prevent passage of the locking wire.

The forced release prevention means may include: a first bending end provided by bending a part of a horizontal support end of the support end parallel to a vertical support end of the support end; and a first insertion catching groove provided between the first bending end and the vertical support end, wherein when the lock/unlock member rotates for locking, the catching end may be inserted into the first insertion catching groove to prevent the passage of the locking wire.

The forced release prevention means may be composed of a stepped catching part provided by bending a part of the vertical support end of the support end upwardly, wherein when the lock/unlock member rotates for locking, the catching end may come into contact with the stepped catching part, preventing the passage of the locking wire.

The forced release prevention means may include: a second bending end provided by bending a part of a horizontal support end of the support end at a right angle to the horizontal support end and a vertical support end of the support end; and a second insertion catching groove provided between the second bending end and the vertical support end, wherein when the lock/unlock member rotates for locking, the catching end may be inserted into the second insertion catching groove to prevent the passage of the locking wire.

According to the present disclosure, by placing travel luggage, bags, and other items in a luggage storage space with an open structure on all sides by frames, and then locking luggage with a wire of a locking device provided on the frame, theft of temporarily stored bulky bags or travel luggage can be prevented.

Furthermore, since the locking device is equipped with a forced release prevention means, the locked wire cannot be forcibly released, and thus theft of luggage can be completely prevented.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, preferred embodiments of the present disclosure will be described in detail with reference to the attached drawings. However, in explaining the present disclosure, descriptions of functions or configurations already known will be omitted in order to clarify the gist of the present disclosure.

In this specification, the terms used are for the purpose of describing the embodiments and are not intended to limit the present disclosure. In this specification, the singular also includes the plural unless specifically stated in the phrase. The words "comprises" and/or "comprising" as used in the specification do not exclude the presence or addition of one or more other components.

In this specification, it should be understood that, when a component is said to be "connected" to another component, the component may be directly connected to that other component, but there may also be other components in between. On the other hand, when it is said that a component is "directly connected" to another component, it should be understood that there are no other components in between.

In this specification, the terms used in this application are only used to describe specific embodiments, and are not intended to limit the present disclosure.

In this specification, the singular expression may include a plural expression unless the context clearly indicates otherwise.

Figure 1:
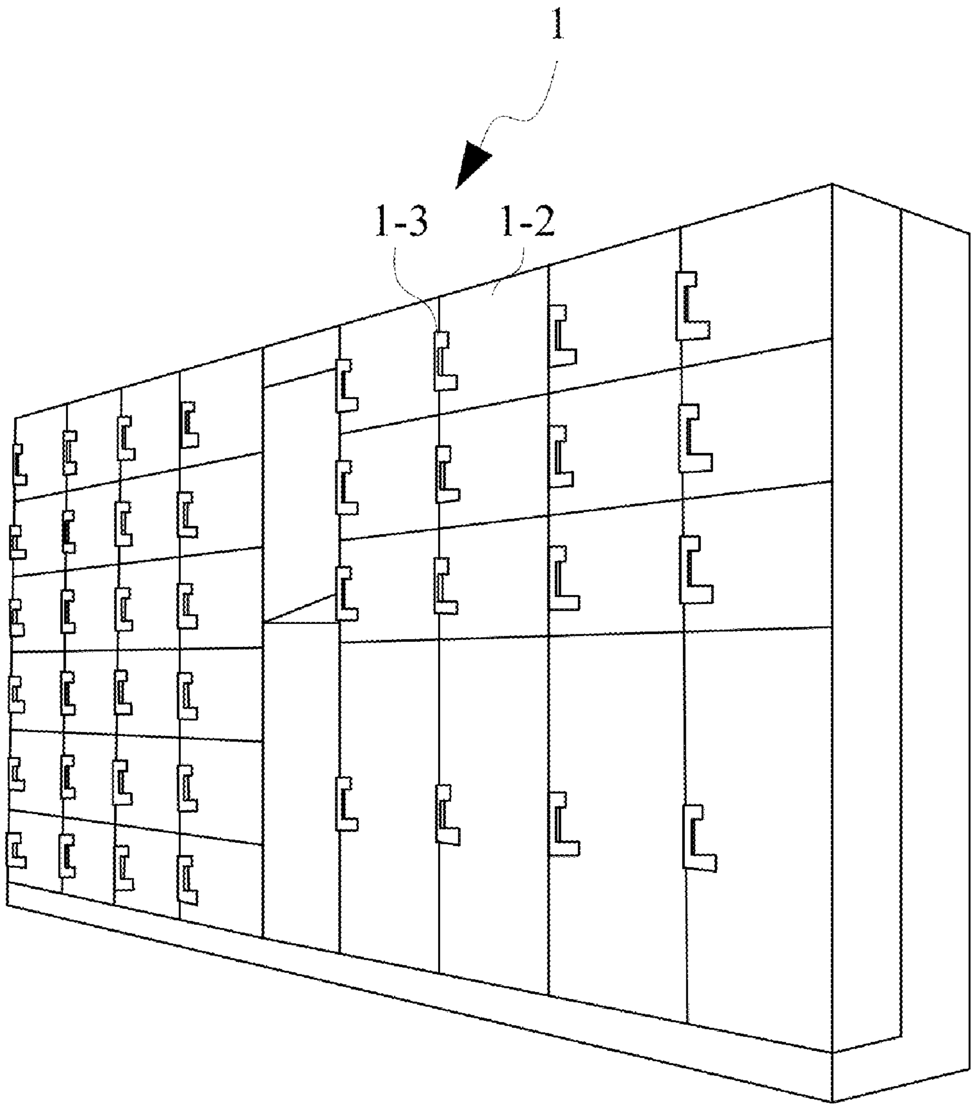
FIG. 1 RELATED ART
FIG. 1 is an image showing a storage unit according to conventional technology.
Figure 2:
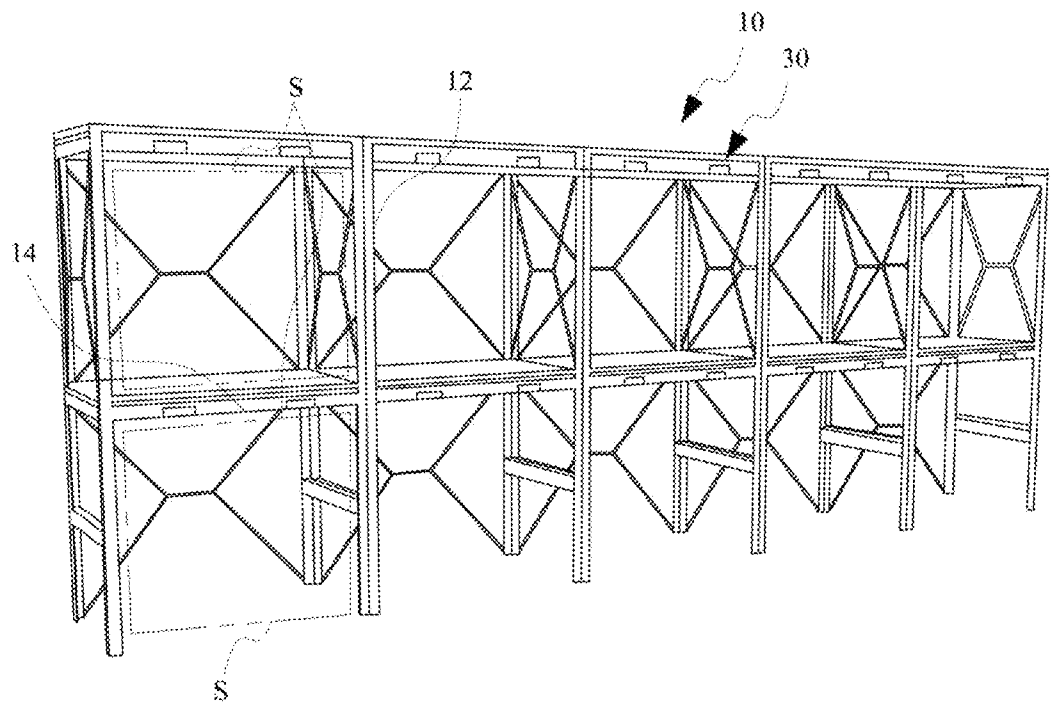
FIGS. 2 and 3 are images showing a locking device for a luggage storage rack according to a first embodiment of the present disclosure.
Figure 3:
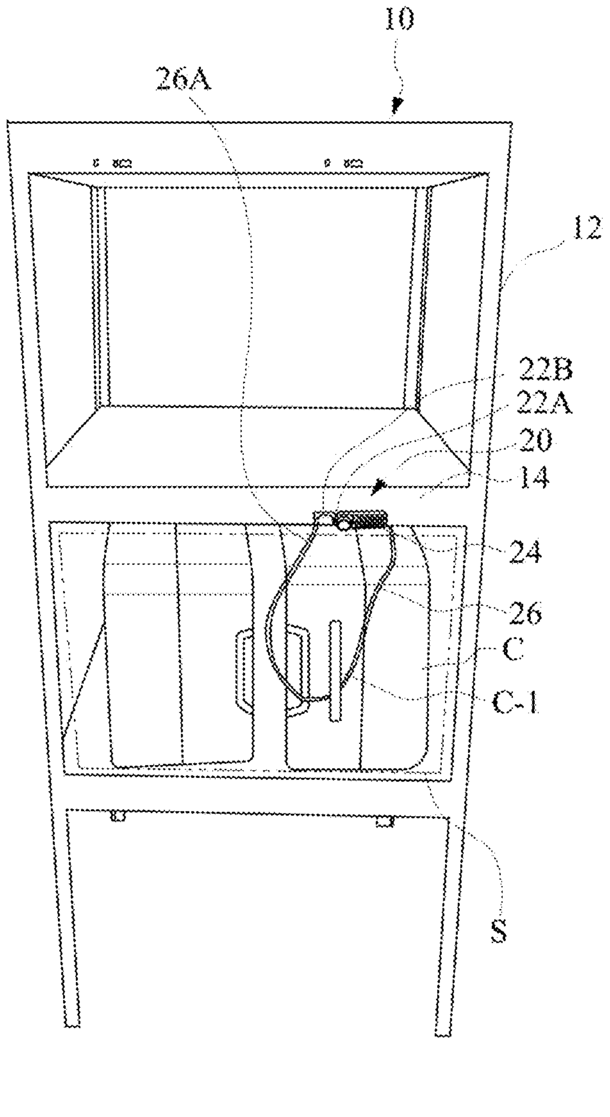
Figure 4:
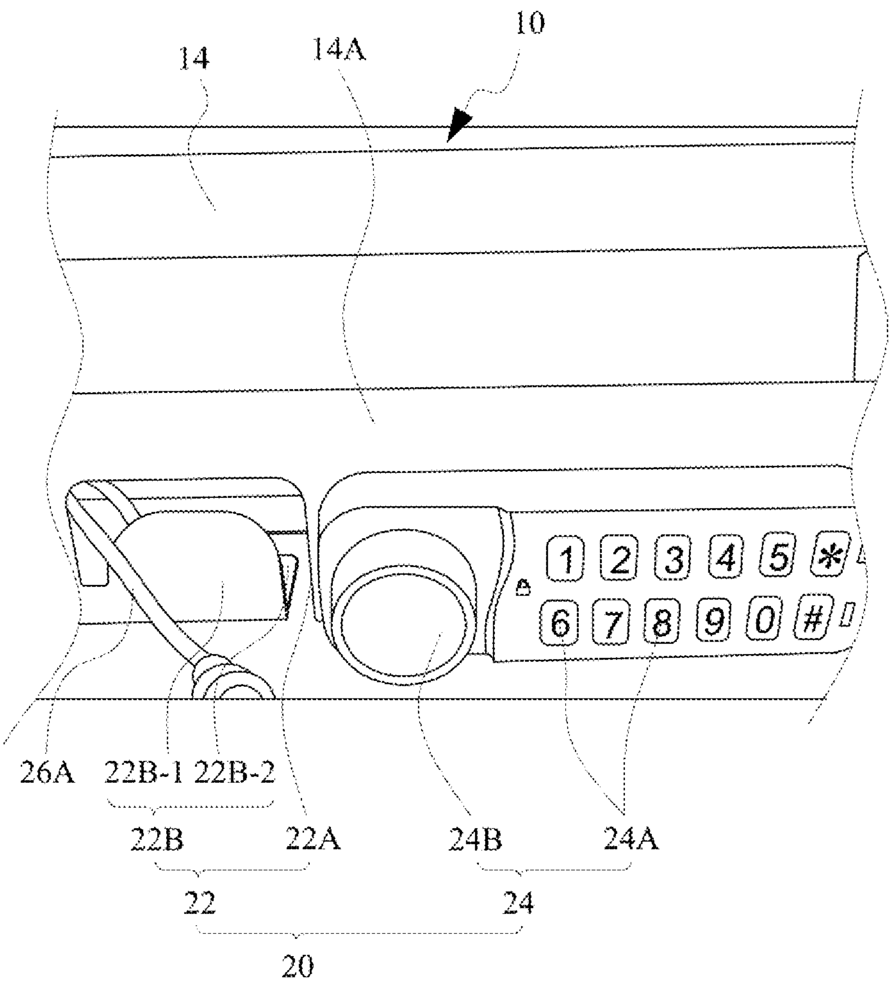
FIGS. 4 and 5 are images of a locking module of the locking device for a luggage storage rack shown in FIGS. 2 and 3 from the front and back, and are partially enlarged images showing a lock/unlock member in an unlocked state.
Figure 5:
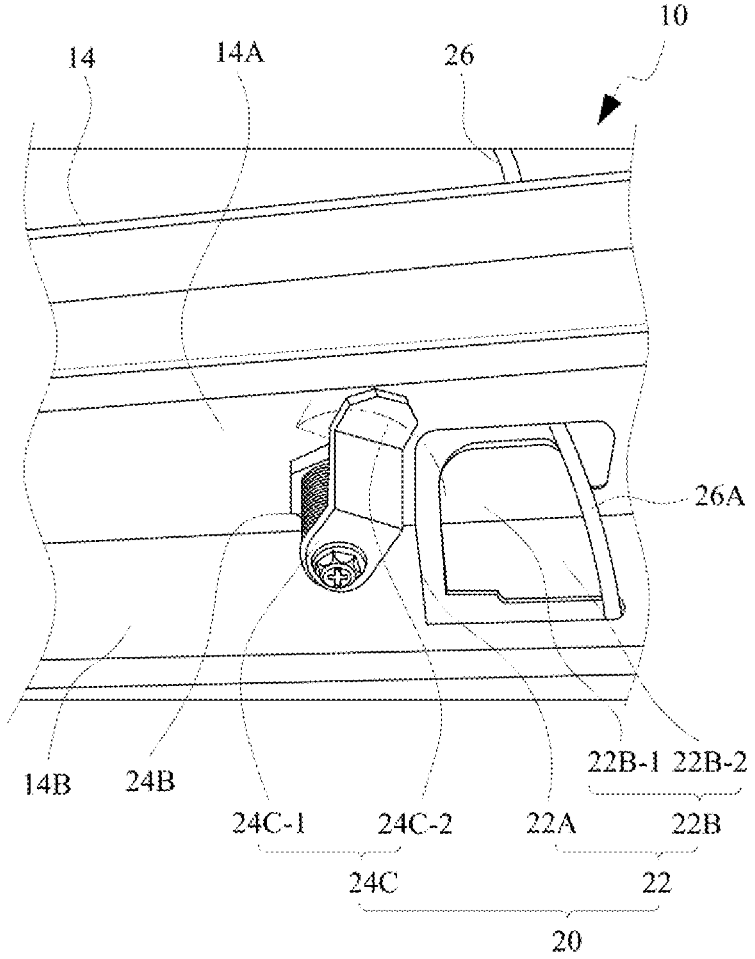
Figure 6:
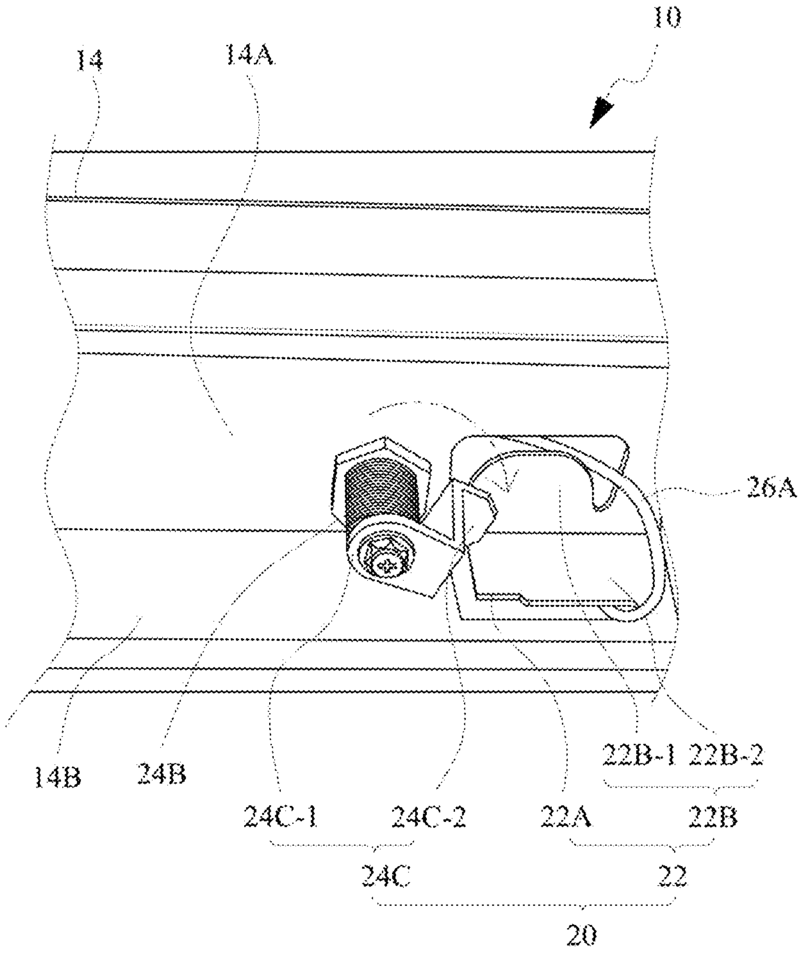
FIG. 6 is an image of the locking module shown in FIG. 5 from the back, and is a partially enlarged image showing a locked state with the lock/unlock member rotated.

Among the attached drawings, FIGS. 2 and 3 are images showing a locking device for a luggage storage rack according to a first embodiment of the present disclosure; FIGS. 4 and 5 are images of a locking module of the locking device for a luggage storage rack shown in FIGS. 2 and 3 from the front and back, and are partially enlarged images showing a lock/unlock member in an unlocked state; and FIG. 6 is an image of the locking module shown in FIG. 5 from the back, and is a partially enlarged image showing a locked state with the lock/unlock member rotated.

A locking device 20 for a luggage storage rack according to a first embodiment of the present disclosure is provided on a travel luggage storage rack 10 consisting of vertical frames 12 arranged vertically and horizontal frames 14 connecting individual vertical frames 12 to create an open luggage storage space S, and is configured to prevent theft of the travel luggage stored in the luggage storage space S.

This will be explained in more detail.

As shown in FIGS. 2 and 3, the storage rack 10 is made up of the vertical frames 12 and the horizontal frames 14, and the luggage storage space S is created between individual vertical frames 12 and horizontal frames 14 to store luggage (a variety of bags, etc.).

The storage rack 10 may be configured to have multiple luggage storage spaces S formed in a row at the upper and lower portions as shown in FIG. 2 for space utilization, and may be configured to form the luggage storage spaces S at the upper and lower portions, respectively, as shown in FIG. 3.

The locking device 20 is provided in a number corresponding to each luggage storage space S provided in the storage rack 10, and is provided on the horizontal frame 14 to prevent theft of luggage stored in the luggage storage space S. The locking device 20 may also be provided on the vertical frame 12.

As shown in FIGS. 4 to 6, the locking device 20 includes a catching part 22 having: a locking hole 22A formed to be connected on a vertical part 14A and a horizontal part 14B of the horizontal frame 14; and a cantilever structure support end 22B formed on the vertical part 14A and the horizontal part 14B due to the locking hole 22A. The locking device 20 includes a locking module 24 provided with a password button 24A, a lock/unlock knob 24B, and a lock/unlock member 24C placed on the back surface (opposite of the front surface where the locking module is installed) of the vertical part 14A, and installed in the vertical part 14A to selectively open and close the locking hole 22A by rotating the lock/unlock member 24C within a set angle. The locking device 20 includes a locking wire 26 with one end fixed to the horizontal frame 14 or the vertical frame 12 while the other end provided with a locking ring 26A for penetration of the support end 22B, wherein the locking ring 26A passes through the handle of luggage stored in the luggage storage space S and then is caught on the support end 22B through the locking hole 22A.

Each component of the locking device 20 configured as above will be described in more detail.

The catching part 22 is provided on the vertical part 14A and the horizontal part 14B of the horizontal frame 14, and the locking hole 22A is formed to be connected on the vertical part 14A and the horizontal part 14B bent in a "ㄴ" shape. Due to the locking hole 22A of this structure, the cantilever structure support end 22B is formed on the vertical part 14A and the horizontal part 14B as shown in FIGS. 4 and 5. In this way, the support end 22B is formed into a cantilever structure so as to be inserted into and locked by the locking ring 26A. That is, this is to insert the locking ring 26A of the closed-loop structure into the locking hole 22A and move the locking ring 26A in one direction so that the support end 22B is inserted into the locking ring 26A and locked.

At this time, the support end 22B is formed to have a cross-section in the shape of a "ㄴ" and has a vertical support end 22B-1 and a horizontal support end 22B-2, so that sufficient rigidity may be achieved.

The locking module 24 is for rotating the lock/unlock member 24C for locking or unlocking. The locking module 24 is provided with the password button 24A and the lock/unlock knob 24B. By pressing a set password and then rotating the lock/unlock knob 24B, the lock/unlock member 24C may be put into the unlocked state. The configuration in which the password button 24A and the lock/unlock knob 24B are provided to lock and unlock the device by pressing the password is well known, and thus a detailed description thereof will be omitted.

The lock/unlock member 24C that is rotated for locking or unlocking by the lock/unlock knob 24B is composed of: a coupling end 24C-1 coupled to the end of a rotary shaft (not shown) coupled to the lock/unlock knob 24B of the locking module 24; and a catching end 24C-2 bent in the direction of the back surface of the vertical part 14A at the coupling end 24C-1 and then bent horizontally again after approaching the back surface of the vertical part 14A. That is, the lock/unlock member 24C has a "┐└" shape.

In this way, as the catching end 24C-2 is formed by being bent horizontally so as to maintain a gap of 0.2 to 2 mm with the back surface of the vertical part 14A or the back surface of the vertical support end 22B-1, the locking wire 26 having a thickness of 3 mm or more may be prevented from passing between the catching end 24C-2 and the back surface of the vertical part 14A or the back surface of the vertical support end 22B-1 and being arbitrarily detached.

The lock/unlock member 24C locks the locking hole 22A as the catching end 24C-2 crosses the locking hole 22A and the end area of the catching end 24C-2 is located on the back surface of the support end 22B when the lock/unlock knob 24B is rotated for locking as shown in FIG. 6.

As shown in FIGS. 3 and 6, the locking wire 26 has one end fixed to the horizontal frame 14 or the vertical frame 12 and the other end provided with the closed-loop locking ring 26A. The locking wire 26 is configured so that the locking ring 26A passes through a handle C-1 of luggage C and then is caught on the support end 22B through the locking hole 22A as shown in FIG. 3.

In the locking wire 26, with the locking ring 26A hooked on the support end 22B, as the lock/unlock member 24C rotates for locking, the catching end 24C-2 crosses the locking hole 22A and closes (locks) the locking hole 22A, so that the locking state of the locking ring 26A is maintained, and as the lock/unlock member 24C rotates for unlocking, the catching end 24C-2 is separated from the locking hole 22A, so that the locking state of the locking ring 26A is released and the locking ring 26A may be separated from the support end 22B through the locking hole 22A.

As described above, by providing the locking device 20 on the storage rack 10 having the luggage storage space S, theft of the luggage C may be prevented as the locking ring 26A of the locking wire 26 passes through the handle C-1 of the luggage C stored in the luggage storage space S and is hooked on the support end 22B through the locking hole 22A, the password is set in the locking module 24, and the lock/unlock member 24C is rotated for locking to prompt the catching end 24C-2 cross the locking hole 22A so that the locking state of the locking ring 26A is maintained.

In addition, with the locking ring 26A hooked on the support end 22B, when the lock/unlock knob 24B is rotated for unlocking to rotate the lock/unlock member 24C for unlocking after the password button 24A of the locking module 24 is pressed for unlocking, the catching end 24C-2 across the locking hole 22A rotates to the original position thereof to open the locking hole 22A, and thus the locking state of the locking ring 26A is released and the locking ring 26A may be separated from the support end 22B.

In this way, the locking device 20 is configured such that, with the locking ring 26A hooked on the support end 22B, the lock/unlock member 24C closes the locking hole 22A to maintain the locking state of the locking wire 26, and when the lock/unlock member 24C opens the locking hole 22A, the locking state of the locking wire 26 is released, the luggage C temporarily stored in the luggage storage space S of the storage rack 10 may be easily locked and unlocked with the locking wire 26, thereby preventing theft of the luggage C.

Figure 7:
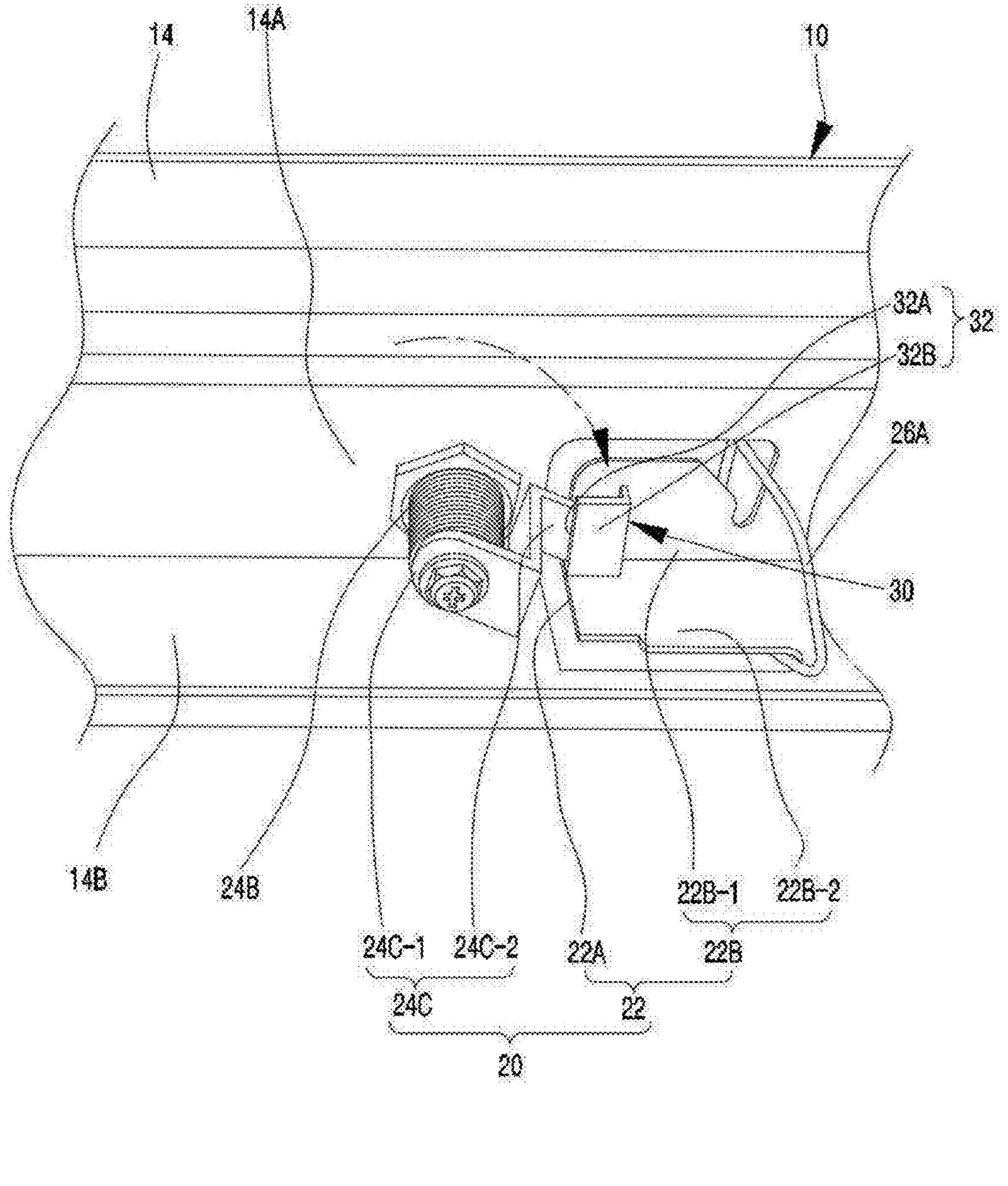
FIG. 7 is a view showing a locking device for a luggage storage rack according to a second embodiment of the present disclosure.

Among the attached drawings, FIG. 7 is a view showing a locking device for a luggage storage rack according to a second embodiment of the present disclosure; and FIGS. 8A and 8B are partially enlarged cross-sectional views showing a forced release prevention means shown in FIGS. 7, and 8B is an enlarged cross-sectional view along line A-A of 8A.

Figure 8:
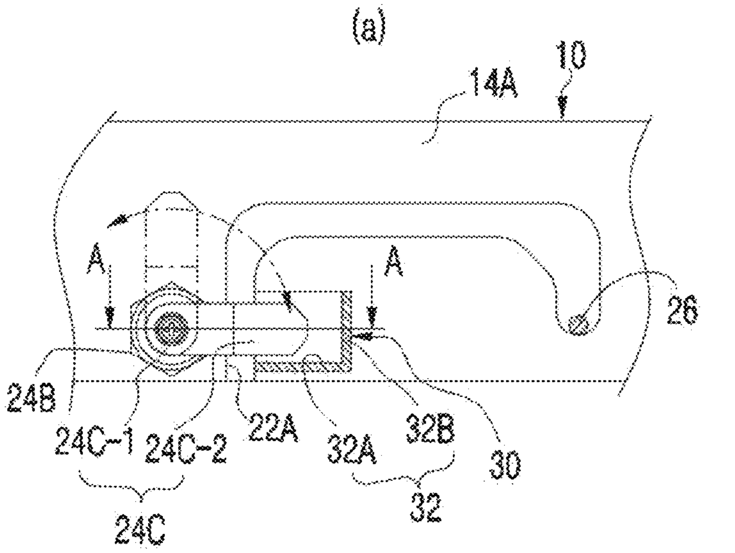
FIG. 8 is partially enlarged cross-sectional views (a) and (b) showing a forced release prevention means shown in FIGS. 7, and 8(*b*) is an enlarged cross-sectional view along line A-A of 8(*a*)
Figure 8:
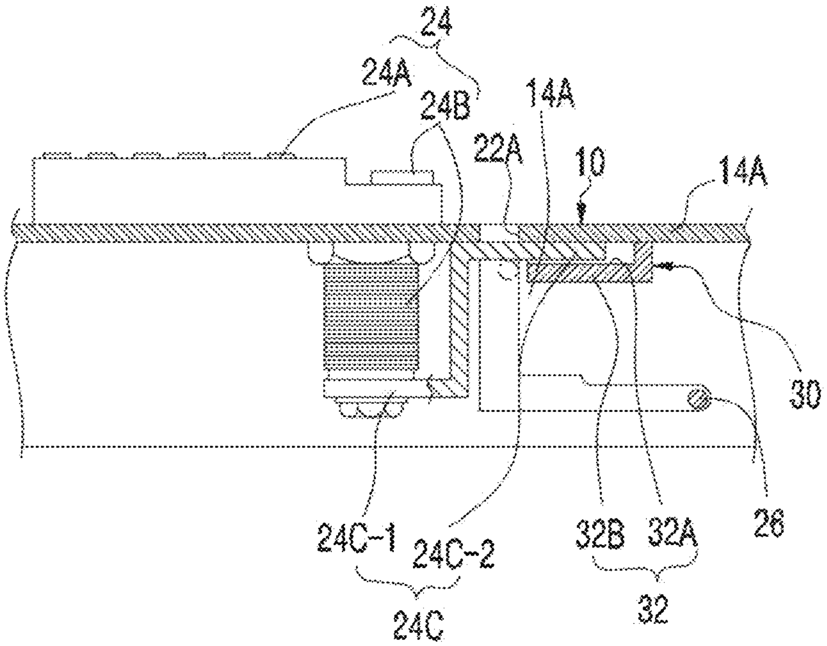

As shown in FIGS. 7 to 8B, a locking device 20 for a luggage storage rack according to a second embodiment is the same as the above-described embodiment except that a forced release prevention means 30 is provided on the back surface of the support end 22B, or on the back surface of the support end 22B and the lock/unlock member 24C to prevent the locking wire 26 from passing between the catching end 24C-2 and the locking hole 22A in a state in which the catching end 24C-2 crosses and closes the locking hole 22A.

The forced release prevention means 30 includes a locking part 32 having an insertion groove 32A provided on the back surface of the support end 22B so that a part of the catching end 24C-2 may be inserted while crossing and closing the locking hole 22A when the lock/unlock member 24C rotates for locking (clockwise rotation based on FIG. 7) around the rotary shaft of the locking module 24.

As shown in FIGS. 7 and 8, the insertion groove 32A of the locking part 32 is formed between an insertion groove forming member 32B and the back surface of the vertical support end 22B-1 due to the insertion groove forming member 32B that protrudes from the back surface of the support end 22B, that is, the back surface of the vertical support end 22B-1. As shown in FIGS. 8(*a*) and (*b*), the insertion groove 32A is provided such that the remaining area is closed except for the side where a part of the catching end 24C-2 is inserted or removed when the lock/unlock member 24C rotates around the rotary shaft. The insertion groove forming member 32B may be formed by cutting and bending a part of the vertical support end 22B-1 or may be formed as a separate part and welded together.

In this way, when the lock/unlock member 24C rotates for locking, a part of the catching end 24C-2 is inserted into the insertion groove 32A, so that the locking wire 26 may be fundamentally prevented from passing through.

Figure 9:
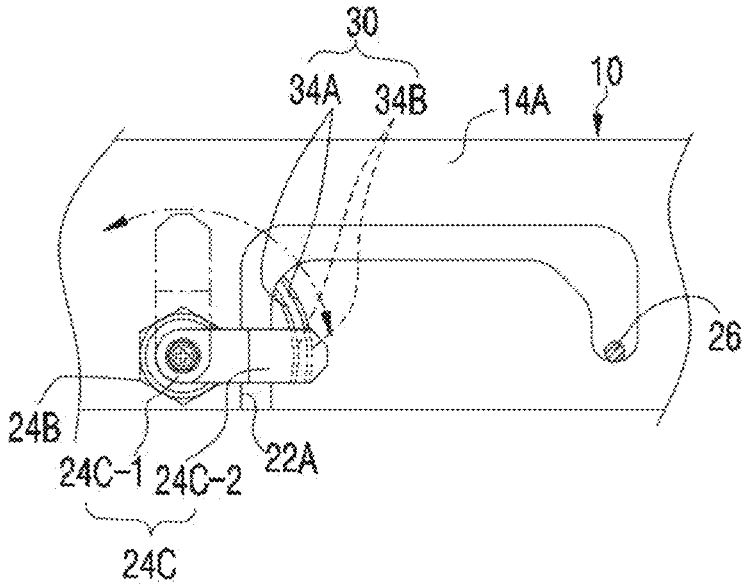
FIG. 9 is a view showing a locking device for a luggage storage rack according to a third embodiment of the present disclosure.
Figure 10:
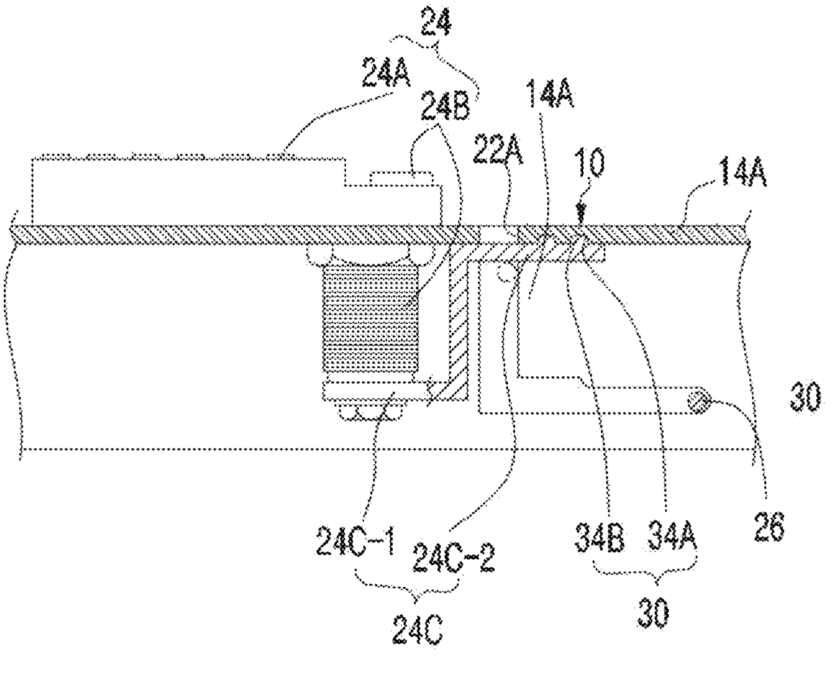
FIG. 10 is a partially enlarged cross-sectional view showing the locking device for a luggage storage rack according to the third embodiment shown in FIG. 9.

Among the attached drawings, FIG. 9 is a view showing a locking device for a luggage storage rack according to a third embodiment of the present disclosure; and FIG. 10 is a partially enlarged cross-sectional view showing the locking device for a luggage storage rack according to the third embodiment shown in FIG. 9.

As shown in FIGS. 9 and 10, a locking device 20 for a luggage storage rack according to a third embodiment is the same as the above-described embodiment except that the forced release prevention means 30 is composed of: at least one separation prevention groove 34A formed in an arc shape on the back surface of the vertical support end 22B-1 of the support end 22B corresponding to the rotational trajectory of the lock/unlock member 24C; and at least one separation prevention protrusion 34B formed with the same curvature as the separation prevention groove 34A on the back surface of the catching end 24C-2 so as to be inserted into the separation prevention groove 34A when the lock/unlock member 24C rotates for locking.

In this way, when the lock/unlock member 24C rotates for locking, the separation prevention protrusion 34B protruding from the back surface of the catching end 24C-2 is inserted into the separation prevention groove 34A formed in an arc shape on the back surface of the vertical support end 22B-1 of the support end 22B, the gap between the catching end 24C-2 and the vertical support end 22B-1 of the support end 22B may be minimized, and thus the locking wire 26 may be fundamentally prevented from passing through and, in turn, the locking state of the locking wire 26 may be fundamentally prevented from being released arbitrarily.

Figure 11:
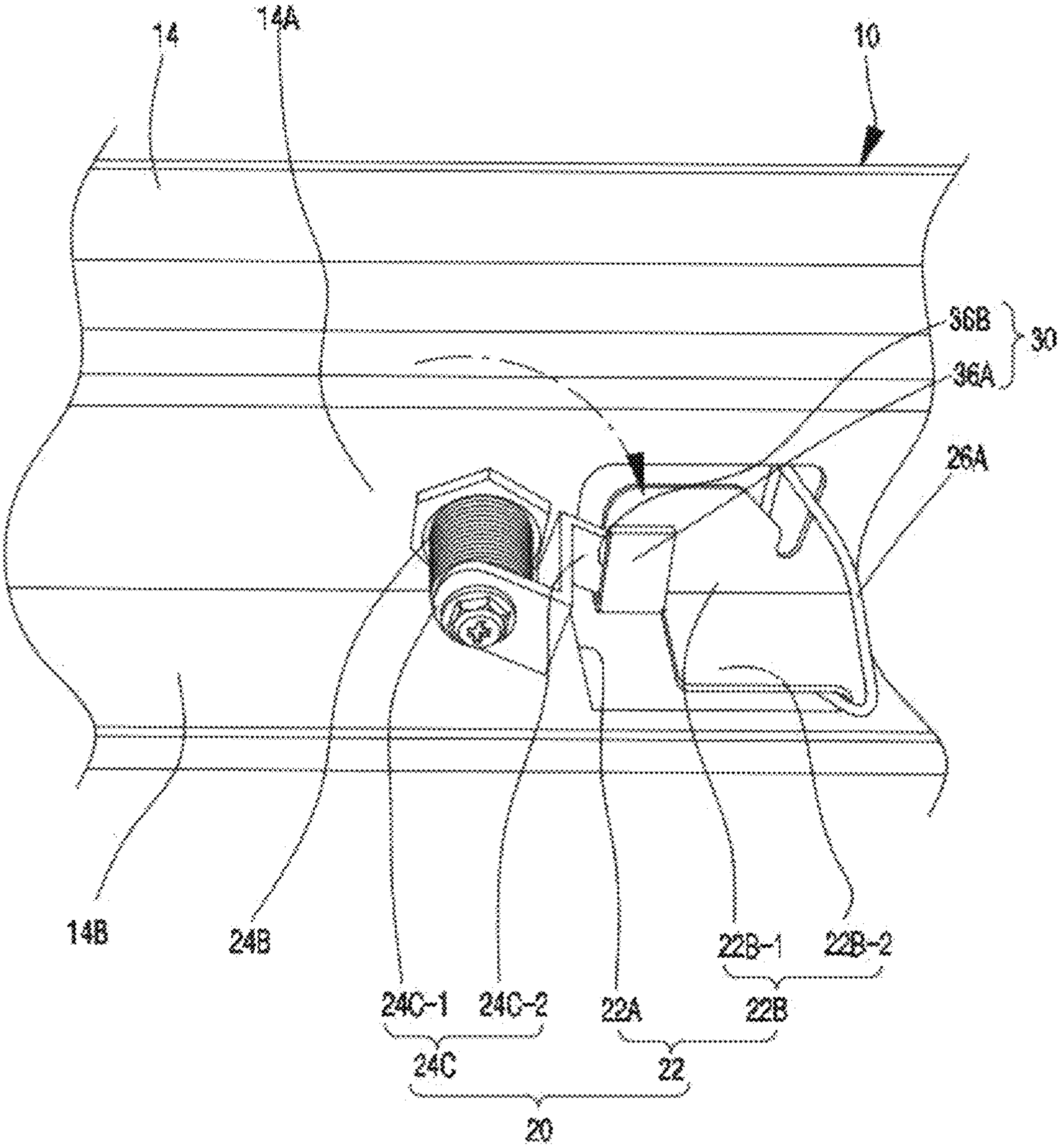
FIG. 11 is a view showing a locking device for a luggage storage rack according to a fourth embodiment of the present disclosure.

Among the attached drawings, FIG. 11 is a view showing a locking device for a luggage storage rack according to a fourth embodiment of the present disclosure.

As shown in FIG. 11, a locking device 20 for a luggage storage rack according to a fourth embodiment is the same as the above-described embodiments except that the forced release prevention means 30 is composed of: a first bending end 36A formed by bending a part of the horizontal support end 22B-2 of the support end 22B parallel to the vertical support end 22B-1 of the support end 22B; and a first insertion catching groove 36B formed between the first bending end 36A and the vertical support end 22B-1.

At this time, the first bending end 36A may be formed by bending the entire horizontal support end 22B-2, or may be formed by cutting a part of the horizontal support end 22B-2 to a certain width and then bending the cut part upward so as to be parallel to the vertical support end 22B-1.

In this way, by providing the first insertion catching groove 36B in which the first bending end 36A is open in three directions on the horizontal support end 22B-2, when the lock/unlock member 24C rotates for locking, a part of the catching end 24C-2 is inserted into the first insertion catching groove 36B to prevent the passage of the locking wire 26. Therefore, it is possible to fundamentally prevent the locking wire 26 from passing between the catching end 24C-2 and the vertical support end 22B-1 and, prevent the locking state of the locking wire 26 from being released arbitrarily.

Figure 12:
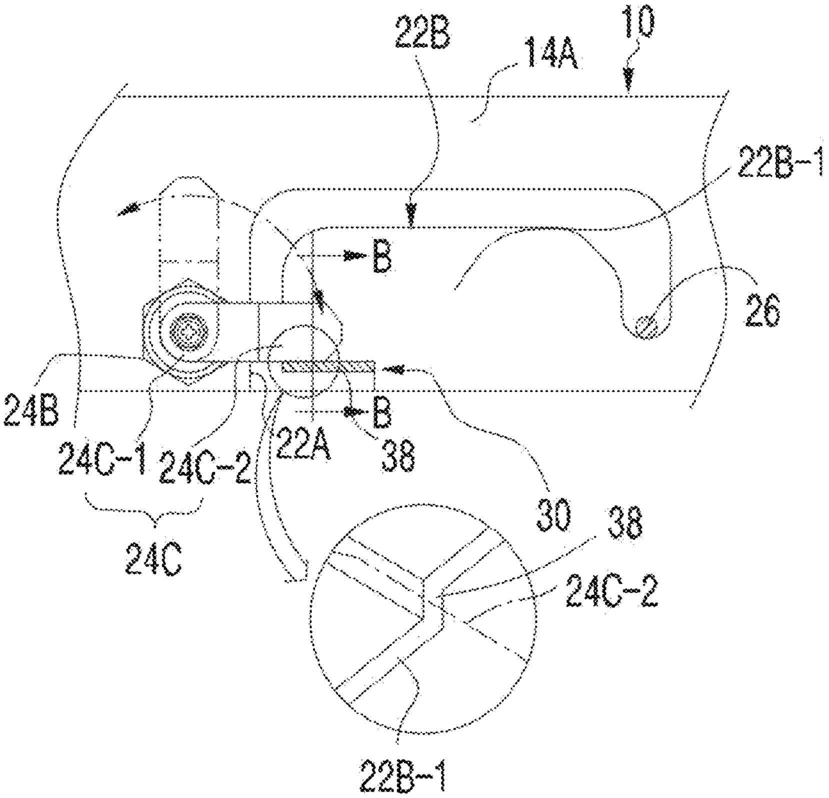
FIG. 12 is a view showing a locking device for a luggage storage rack according to a fifth embodiment of the present disclosure.
Figure 13:
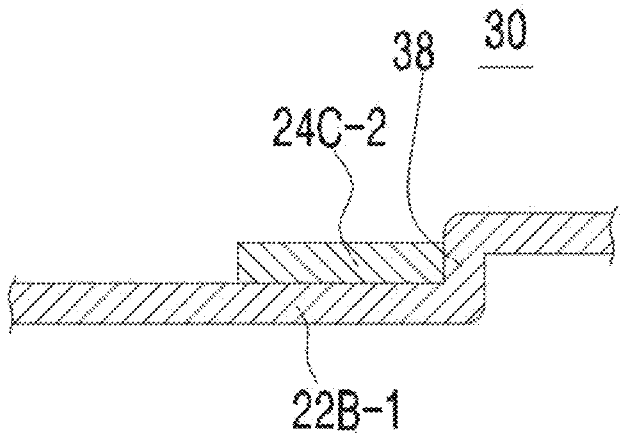
FIG. 13 is a partially enlarged cross-sectional view taken along line B-B of FIG. 12, showing the forced release prevention means illustrated in FIG. 12.

FIG. 12 is a view showing a locking device for a luggage storage rack according to a fifth embodiment of the present disclosure; and FIG. 13 is a partially enlarged cross-sectional view taken along line B-B of FIG. 12, showing the forced release prevention means illustrated in FIG. 12.

As shown in FIGS. 12 and 13, a locking device 20 for a luggage storage rack according to a fifth embodiment is the same as the above-described embodiment except that the forced release prevention means 30 is composed of: a stepped catching part 38 formed by bending a part of the vertical support end 22B-1 of the support end 22B upwardly, that is, bending at a right angle to the vertical support end 22B-1.

At this time, the stepped catching part 38 may be formed by stepwise bending of the entire vertical support end 22B-1, or may be formed by stepwise bending of a portion of the vertical support end 22B-1 after cutting the portion.

In the forced release prevention means 30 of the locking device 20 for a luggage storage rack according to the fifth embodiment configured in this way, since a part of the vertical support end 22B-1 of the support end 22B is bent upward to form the stepped catching part 38, when the lock/unlock member 24C rotates for locking, a part of the catching end 24C-2 comes into contact with the stepped catching part 38, preventing the passage of the locking wire 26. Therefore, it is possible to fundamentally prevent the locking wire 26 from passing between the catching end 24C-2 and the vertical support end 22B-1 and, prevent the locking state of the locking wire 26 from being released arbitrarily.

Figure 14:
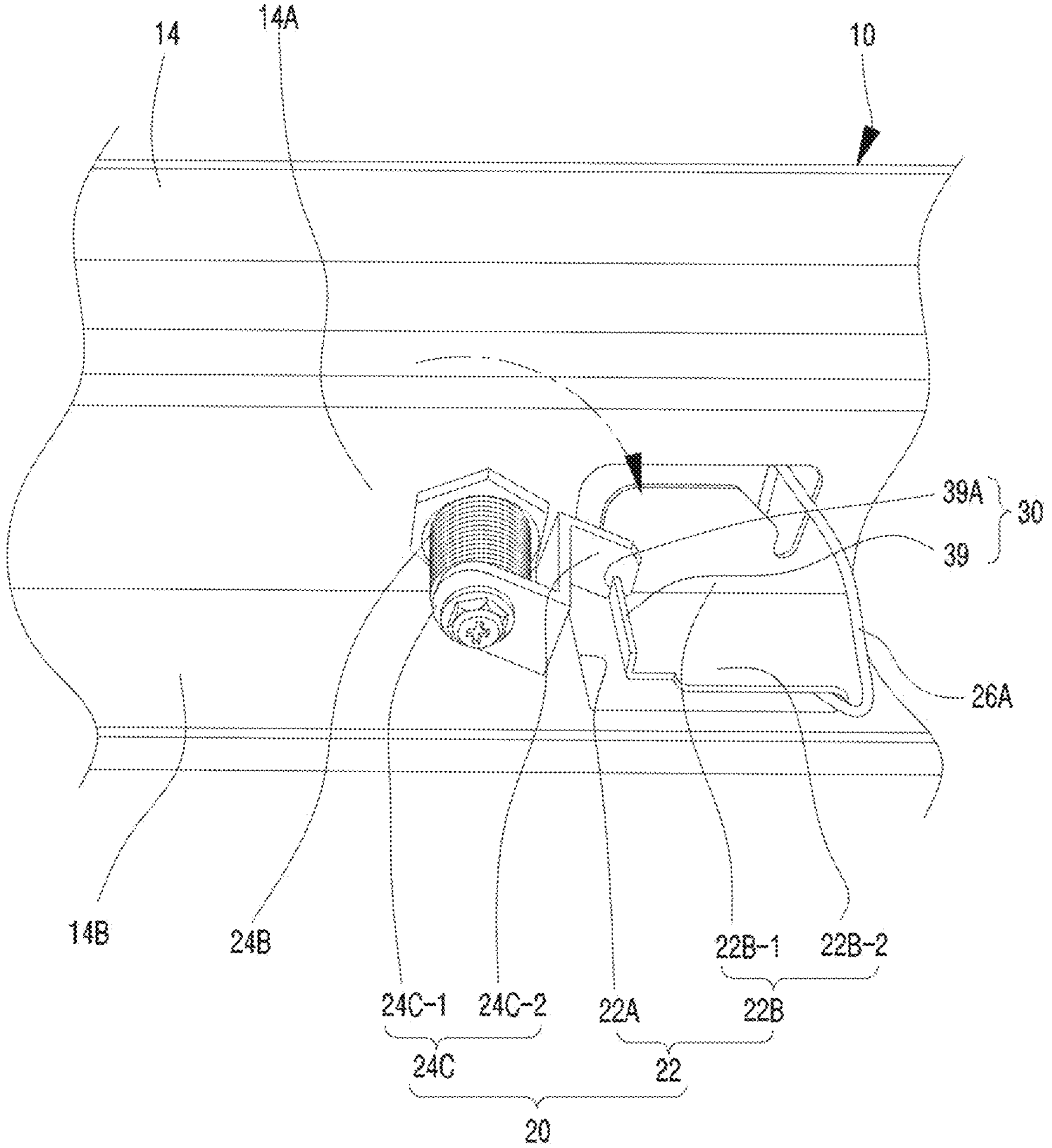
FIG. 14 is a view showing a locking device for a luggage storage rack according to a sixth embodiment of the present disclosure.

Among the attached drawings, FIG. 14 is a view showing a locking device for a luggage storage rack according to a sixth embodiment of the present disclosure.

A locking device 20 for a luggage storage rack according to a sixth embodiment is the same as the above-described embodiments except that the forced release prevention means 30 is composed of: a second bending end 39 formed by bending a part of the horizontal support end 22B-2 of the support end 22B at a right angle (vertical upward bend based on FIG. 14) to the horizontal support end 22B-2 and the vertical support end 22B-1; and a second insertion catching groove 39A formed between the second bending end 39 and the vertical support end 22B-1.

In this way, by forming the second bending end 39 on the horizontal support end 22B-2, and the second insertion catching groove 39A between the second bending end 39 and the vertical support end 22B-1, when the lock/unlock member 24C rotates for locking, the catching end 24C-2 is inserted into the second insertion catching groove 39A to fundamentally prevent the locking state of the locking wire 26 from being released arbitrarily.

Although specific embodiments of the present disclosure have been described and illustrated above, it will be apparent to those skilled in the art that the present disclosure is not limited to the described embodiments, but various modifications and variations can be made without departing from the spirit and scope of the present disclosure. Therefore, such modifications or variations should not be understood individually from the technical idea or viewpoint of the present disclosure, and the modified embodiments should fall within the scope of the claims of the present disclosure.

What is claimed is:

1. A locking device for a luggage storage rack, which is provided on a travel luggage storage rack consisting of vertical frames arranged vertically and horizontal frames connecting the vertical frames to create an open luggage storage space, and is provided on any of the horizontal frames to prevent theft of luggage stored in the luggage storage space, the locking device comprising:

a catching part having: a locking hole formed to be connected on a vertical part and a horizontal part of each of the horizontal frames; and a cantilever structure support end provided on the vertical part and the horizontal part due to the locking hole;

a locking module provided with a password button, a lock/unlock knob, and a lock/unlock member placed on a back surface of the vertical part, and installed in the vertical part to selectively open and close the locking hole by rotating the lock/unlock member within a set angle; and a locking wire with a first end fixed to each of the horizontal frames or the vertical frames while a second end provided with a locking ring for penetration of the support end, wherein the locking ring passes through a handle of the luggage stored in the luggage storage space and then is caught on the support end through the locking hole, wherein with the locking ring hooked on the support end, the lock/unlock member closes the locking hole to maintain a locking state of the locking wire, and when the lock/unlock member opens the locking hole, the locking state of the locking wire is released.

2. The locking device of claim 1, wherein the lock/unlock member comprises:

a coupling end coupled to an end of a rotary shaft of the locking module; and a catching end bent in a direction of the back surface of the vertical part at the coupling end and then bent horizontally again after approaching the back surface of the vertical part, so that when the lock/unlock knob rotates for locking, an end area of the catching end is located on a back of the support end.

3. The locking device of claim 2, wherein on the back of the support end, or on the back of the support end and the lock/unlock member, a forced release prevention member is provided to prevent the locking wire from passing between the catching end and an edge of the locking hole in a state in which the catching end crosses and closes the locking hole.

4. The locking device of claim 3, wherein the forced release prevention member comprises:

a first bending end provided by bending a part of a horizontal support end of the support end parallel to a vertical support end of the support end; and a first insertion catching groove provided between the first bending end and the vertical support end, wherein when the lock/unlock member rotates for locking, the catching end is inserted into the first insertion catching groove to prevent passage of the locking wire.

5. The locking device of claim 3, wherein the forced release prevention member comprises:

a second bending end provided by bending a part of a horizontal support end of the support end at a right angle to the horizontal support end and a vertical support end of the support end; and a second insertion catching groove provided between the second bending end and the vertical support end, wherein when the lock/unlock member rotates for locking, the catching end is inserted into the second insertion catching groove to prevent passage of the locking wire.

* * * * *